United States Patent
Prosperi et al.

(10) Patent No.: US 7,464,277 B2
(45) Date of Patent: Dec. 9, 2008

(54) MICROPROCESSOR PERFORMANCE MODE CONTROL UTILIZING SENSED TEMPERATURE AS AN INDICATION OF MICROPROCESSOR UTILIZATION

(75) Inventors: Roberto Prosperi, Cedar Park, TX (US); Mohammed Hijazi, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 436 days.

(21) Appl. No.: 11/046,433

(22) Filed: Jan. 28, 2005

(65) Prior Publication Data

US 2006/0174146 A1 Aug. 3, 2006

(51) Int. Cl.
*G06F 1/00* (2006.01)
*G06F 1/26* (2006.01)
*G06F 1/32* (2006.01)

(52) U.S. Cl. .................. 713/320; 713/300; 713/322

(58) Field of Classification Search ................ 713/320, 713/300, 322
See application file for complete search history.

(56) References Cited

U.S. PATENT DOCUMENTS

| | | | | |
|---|---|---|---|---|
| 5,451,892 | A | 9/1995 | Bailey | 327/113 |
| 5,604,906 | A | 2/1997 | Murphy et al. | 395/712 |
| 5,752,011 | A * | 5/1998 | Thomas et al. | 713/501 |
| 5,774,704 | A * | 6/1998 | Williams | 713/501 |
| 5,857,072 | A | 1/1999 | Crowle | 395/200.33 |
| 5,996,084 | A | 11/1999 | Watts | 713/323 |
| 6,009,274 | A | 12/1999 | Fletcher et al. | 395/712 |
| 6,020,820 | A | 2/2000 | Chiang | 340/584 |
| 6,256,673 | B1 | 7/2001 | Gaymann | 709/232 |
| 6,397,343 | B1 * | 5/2002 | Williams et al. | 713/501 |
| 6,427,211 | B2 | 7/2002 | Watts, Jr. | 713/320 |
| 6,470,289 | B1 * | 10/2002 | Peters et al. | 702/132 |
| 6,510,400 | B1 | 1/2003 | Moriyama | 702/132 |
| 6,600,743 | B1 | 7/2003 | Lee et al. | 370/390 |
| 6,845,456 | B1 * | 1/2005 | Menezes et al. | 713/320 |

(Continued)

FOREIGN PATENT DOCUMENTS

| | | |
|---|---|---|
| JP | 2004-157753 | 3/2004 |
| WO | 02/35348 | 5/2002 |

OTHER PUBLICATIONS

Stephen H. Gunther, "Managing the Impact of Increasing Microprocessor Power Consumption"; 2001; Intel Technology Journal Q1; pp. 1-9.
Irish Patent Office, Application No. 2005/0324, Search Report, Mar. 20, 2007.

*Primary Examiner*—Thomas Lee
*Assistant Examiner*—Ji H Bae
(74) *Attorney, Agent, or Firm*—O'Keefe, Egan, Peterman & Enders, LLP

(57) ABSTRACT

Methods and systems are disclosed for controlling microprocessor (CPU) performance modes utilizing sensed temperatures as an indication of CPU utilization. By recognizing that temperature can be used as an indication of CPU utilization, higher performance modes can be entered as temperature increases, and lower performance modes can be entered as temperature decreases.

20 Claims, 4 Drawing Sheets

U.S. PATENT DOCUMENTS

| | | | |
|---|---|---|---|
| 6,996,730 B2 * | 2/2006 | Bonnett | 713/322 |
| 7,036,030 B1 * | 4/2006 | Altmejd | 713/322 |
| 7,124,309 B2 * | 10/2006 | Burns et al. | 713/300 |
| 2003/0236863 A1 | 12/2003 | Johnson et al. | 709/219 |
| 2004/0088593 A1 | 5/2004 | Park | 713/322 |
| 2004/0139256 A1 | 7/2004 | Lee | 710/104 |
| 2005/0049818 A1 * | 3/2005 | Liang et al. | 702/132 |
| 2006/0236320 A1 | 10/2006 | Chen et al. | 717/176 |

* cited by examiner

MICROPROCESSOR PERFORMANCE MODE CONTROL UTILIZING SENSED TEMPERATURE AS AN INDICATION OF MICROPROCESSOR UTILIZATION

TECHNICAL FIELD OF THE INVENTION

This invention relates to managing voltage and clock settings for microprocessors and, more particularly, to controlling performance modes for microprocessors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are computer systems that use microprocessors (CPUs) designed for desktop computers. These computer systems are not typically designed with a means for actively reducing CPU power in response to software demand. Rather, such computer systems are typically configured to operate at a fixed frequency and core voltage pair. Under many situations, this results in higher than optimal power draw due to the variable nature of the software demand. This increased power requirement has three main drawbacks. Firstly, it results in higher than optimal utility costs. Secondly, the extra CPU power draw translates directly into increased heat generation. As a consequence, this increased heat level requires more air flow than might otherwise have been necessary. In order to achieve the higher air flow levels, the fans or blowers used for cooling must be operated at a higher speed. This results in additional acoustic noise generation. Finally, when this type of CPU is used in a computer system running on battery power, the result will be reduced battery life.

Technologies that reduce CPU power via combined frequency and voltage control are most often found in CPUs designed specifically for notebook computers. In these implementations, software code to achieve this functionality is either embedded into the operating system or takes the form of a small application which runs on top of the operating system. This code monitors CPU demand and sends instructions to the CPU to change into the voltage/frequency state appropriate to the demand. Two difficulties related to this CPU performance management scheme are the lack of inclusion of this technology on desktop CPUs as well as the need for operating-system-level software specific to the CPU being controlled.

Information handling systems, such as computer systems, have also been designed to monitor temperatures related to the microprocessor in order to control cooling devices, such as the speed at which cooling fans operate. In addition, some desktop CPUs have been configured to make use of a technology that is designed to control processor temperature under extreme environmental conditions in order to protect damage to the CPU and/or system components. This technology can be a hardware feature built into the CPU. When active, it drops the voltage and frequency of the processor automatically as a means to dramatically lower CPU power and hence processor temperature when a over-heating condition is detected. This hardware temperature protection feature, therefore, is used to reduce CPU performance and place the CPU in a low power protection mode when the temperature rises above a danger threshold.

SUMMARY OF THE INVENTION

The present invention provides systems and methods for controlling microprocessor (CPU) performance modes utilizing sensed temperatures as an indication of CPU utilization. By recognizing that temperature can be used as an indication of CPU utilization or software demand, higher performance modes can be entered as temperature increases, and lower performance modes can be entered as temperature decreases. As such, power utilized by the CPU can be reduced without requiring operating system specific software to be operating.

In one embodiment, the present invention is a method for controlling microprocessor performance modes including sensing a temperature related to a microprocessor as an indication of microprocessor utilization, increasing a performance level for the microprocessor if the sensed temperature rises above a first threshold level, and decreasing a performance level for the microprocessor if the sensed temperature falls below a second threshold level. As described below, other features and variations can be implemented, if desired, and a related systems can be utilized, as well.

In another embodiment, the present invention is an information handling system having microprocessor performance mode control including a microprocessor, a temperature sensor and control circuitry. The microprocessor has a plurality of performance levels. The temperature sensor is configured to sense temperatures related to the microprocessor as an indication of microprocessor utilization. And the control circuitry is coupled to receive a signal from the temperature sensor and to control the microprocessor performance mode to increase a performance level for the microprocessor as the sensed temperature rises and to decrease a performance level for the microprocessor as the sensed temperature falls. As described below, other features and variations can be implemented, if desired, and a related method can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
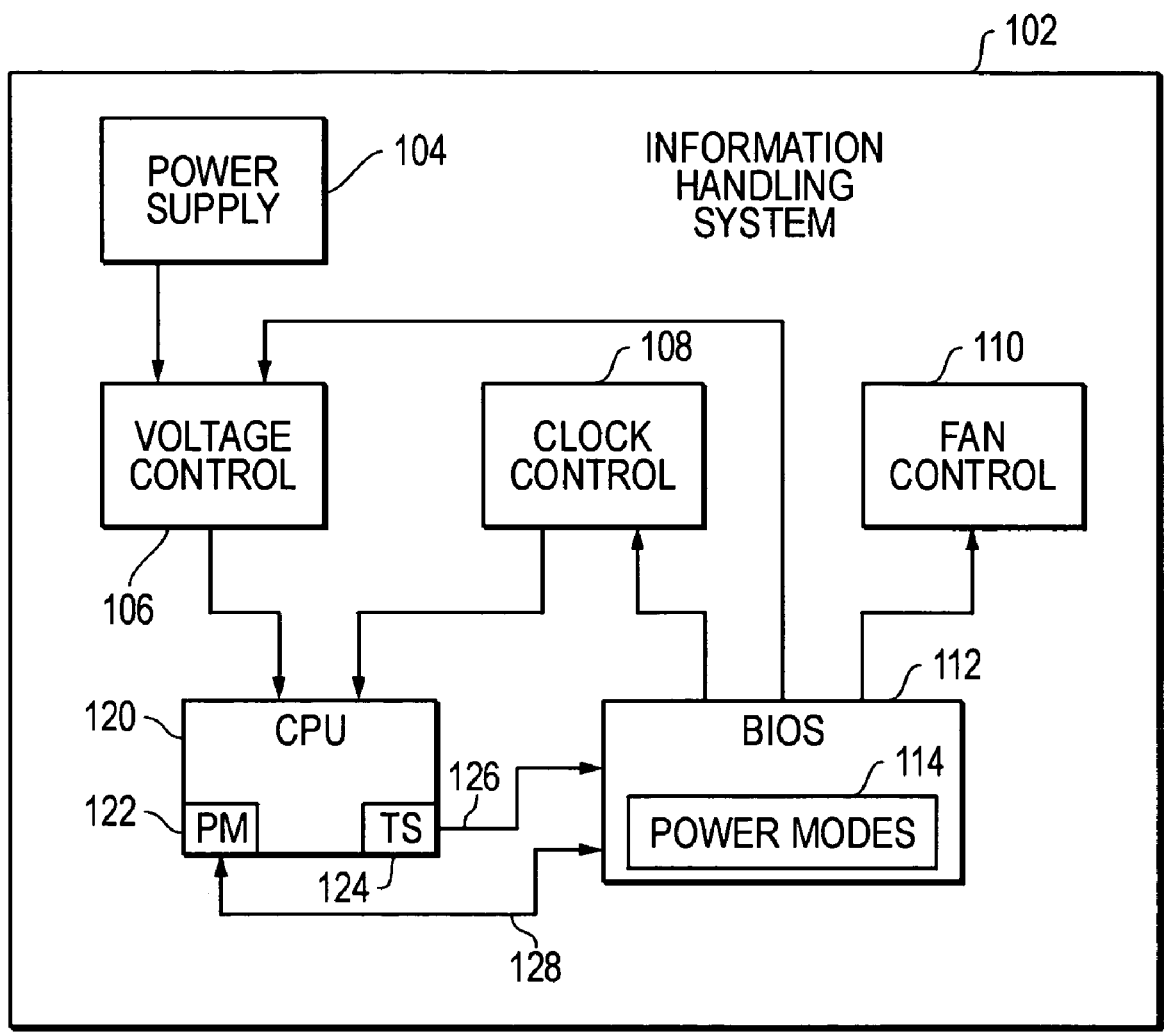
FIG. 1 is a block diagram for an information handling system including BIOS configured to manage microprocessor (CPU) performance modes by using temperature measurements as an indication of CPU utilization.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention provides systems and methods for controlling microprocessor (CPU) performance modes for information handling systems by utilizing sensed temperatures as an indication of CPU utilization. By recognizing that temperature can be used as an indication of CPU utilization, higher performance modes can be entered as temperature increases, and lower performance modes can be entered as temperature decreases.

In one respect, the present invention is useful when applied to CPUs that include a hardware-controlled CPU-protection temperature sensor. Such CPUs have internal temperature sensors that are used to sense core CPU temperatures. Hardware coding then utilizes this sensed core temperature to protect the CPU when the sensed temperature rises above a threshold level that could potentially damage the CPU. When such an elevated temperature is sensed, the CPU is placed into a low performance mode in order to reduce its core temperature. In addition, the performance mode is controlled by a control setting, and this control setting can be reported to external circuitry and/or set by a control signal from the external circuitry through a bi-directional communication path.

In contrast to this operation, when software code implementing the present invention is applied to such a CPU, the code acts to invoke this hardware protection feature in a novel way. Rather than forcing the CPU into a low performance mode when a threshold temperature is exceeded, the present invention utilizes a sensed temperature to indicate CPU utilization and software demand and moves the CPU from its low performance mode to its high performance mode when a sensed temperature rises above a particular threshold temperature. For example, a separate temperature sensor, such as a CPU edge diode temperature sensor, and not the built-in hardware over-temperature sensor, can be used as an indication of CPU utilization. It is noted that an edge diode temperature sensor is available on many existing desktop CPUs as an analog signal. This analog signal can be converted to a digital form suitable for use by the system BIOS (Basic Input Output System) or similar control structure that is configured to implement the performance mode control of the present invention.

The BIOS or other control algorithm implemented can be based on the principle that a sensed temperature related to the CPU, such as the CPU edge diode temperature, will be at its lowest level when application demand is lowest. As such, the CPU is initially set at the lower voltage/frequency state via the bi-directional activation of the hardware over-temperature signal. Thus, the CPU is initially placed into its low power mode (LPM), for example, by setting a hardware protection bit to an appropriate value. When CPU demand remains low, the CPU edge diode temperature does not increase significantly and no action is taken. If the edge diode temperature is seen to increase beyond a threshold temperature programmed in the BIOS, this increase in temperature is interpreted as a sign of increased CPU demand. Consequently, the CPU is then placed in full performance mode (FPM), which is the mode with the highest voltage/frequency pair. As the transition to the full performance mode is achieved, the edge diode temperature will increase as a result. If the edge diode temperature is seen to drop back below another downward-triggered threshold in response to reduced CPU demand, the bi-directional over-temperature signal is again invoked in response to re-enable the low power mode (LPM). As discussed further below, a delay time may be included before each of the two possible transitions to ensure adequate time for the edge diode temperature to stabilize.

With respect to CPUs with hardware temperature protection, therefore, the present invention provides for simultaneous voltage and frequency reduction as a means to create a low power mode with a desktop CPU not specifically designed to support such a function and provides a method to use the edge temperature as a way to judge application demand and to act as a means to place the CPU in and out of the low power mode described above.

FIG. 1 is a block diagram for an information handling system 102 including BIOS 112 configured to manage microprocessor (CPU) performance modes by using temperature measurements as an indication of CPU utilization. In the embodiment depicted, the information handling system 102 includes a CPU 120 that receives a clock signal from clock control circuitry 108 and a voltage supply from voltage control circuitry 106. Voltage control circuitry is in turn coupled to a power supply 104. CPU 120 also includes a temperature sensor (TS) 124 and performance mode control circuitry 122, as discussed in more detail below. The temperature sensor (TS) 124 can be implemented as a temperature sensing diode located at the edge of the CPU 120. The BIOS 112 represents a memory device, such as an EEPROM, that stores software capable of performing the BIOS functions. The BIOS 112 includes power modes control block 114, and BIOS 112 outputs control signals to voltage control circuitry 106, clock control circuitry 108, and fan control circuitry 110. In addition, BIOS 112 receives signals 126 from CPU 120 that represent the temperature values being detected by temperature sensor (TS) 124. BIOS 112 also has a bidirectional communication path to the CPU 120 through signals 128. These signals 128 can include performance mode status information and control information related to performance mode block 122. It is noted that the signal 126, if analog, can be digitized before use by BIOS 112.

Figure 2:
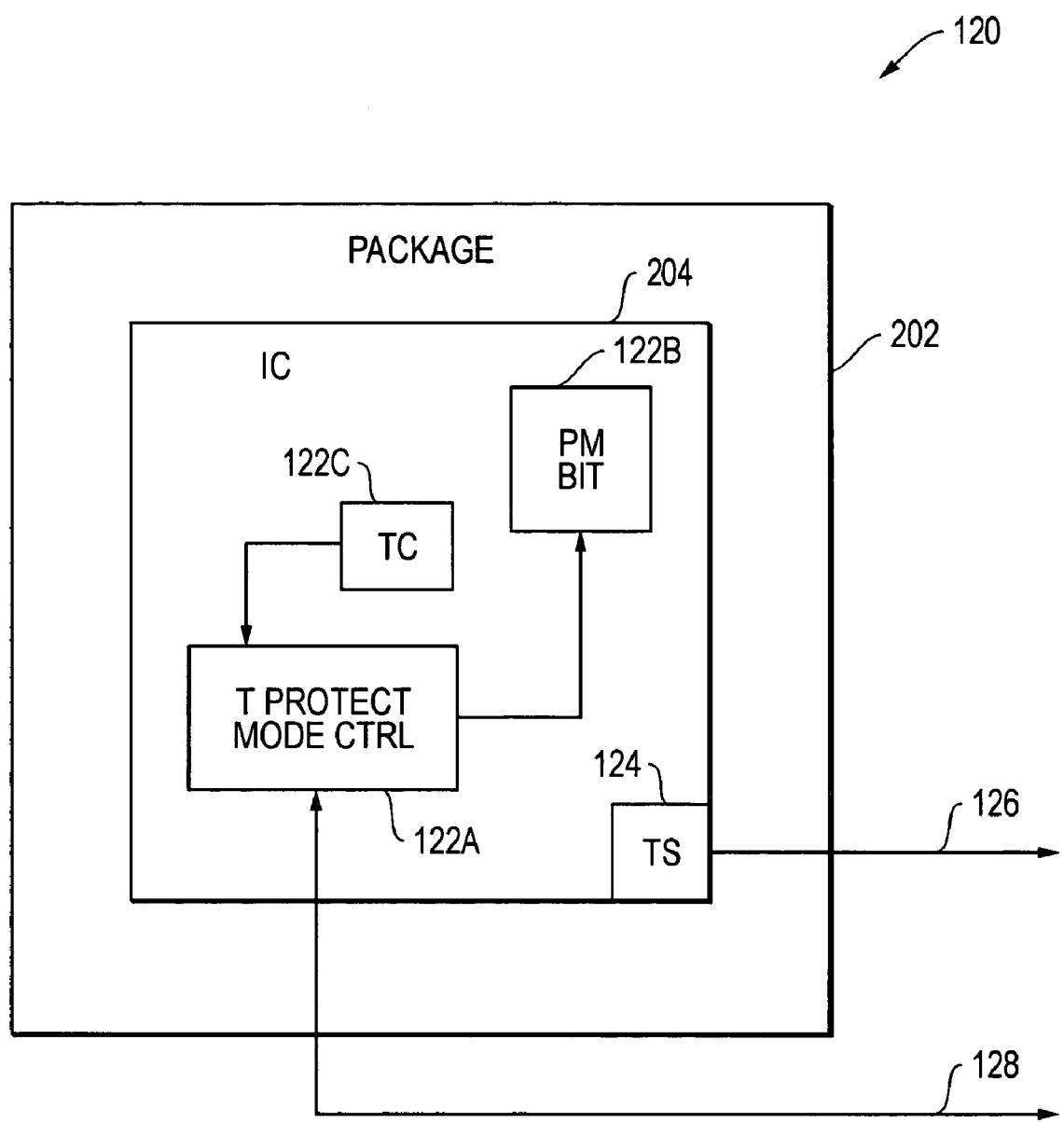
FIG. 2 is a block diagram for a microprocessor having a CPU protection mode for protecting the CPU when internal temperatures are above a threshold level.

FIG. 2 is a block diagram for a CPU 120 having a CPU protection mode for protecting the CPU when internal temperatures are above a threshold level. As depicted, the CPU 120 includes an integrated circuit portion 204 and a chip package portion 202. The integrated circuit 204 can include a temperature sensor (TS) 124, which may be located, for example, at the edge of the integrated circuit 204. The temperature sensor (TS) 124 measures the temperature at the edge of the integrated circuit portion 124. The analog temperature value is output as signals 126. It is noted that this value could be processed and digitized internally before being output, if desired, or can be processed and digitized externally before being used by external control circuitry, such as BIOS 112 in FIG. 1.

The performance mode control circuitry 122 of FIG. 1 can be implemented as desired to allow for the performance of the CPU 120 to be adjusted based upon the temperatures measured by the temperature sensor (TS) 124. In the embodiment shown, a core temperature sensor (TC) 122C communicates a core CPU temperature value to a temperature protection mode controller 122A, and this mode controller 122A controls the CPU performance mode through a control setting 122B. This control setting 122B is based upon the detected core temperature. It is noted that the performance mode control setting 122B can be implemented as a single bit, if desired. If the core temperature (TC) 122C stays below a determined threshold value, then the temperature protection mode controller 122A keeps the CPU 120 running in high performance mode by setting the performance mode control setting 122B to the appropriate value. If the core temperature (TC) 122C moves above a determined threshold value, then the temperature protection mode controller 122A can drop the CPU 120 into a low performance mode to protect the CPU by setting the performance mode control setting 122B to the appropriate value. The status for the performance mode control setting 122B can be reported externally through signals 128, and the performance mode control setting 122B can be set by an external device using signals 128, as well.

Figure 3:
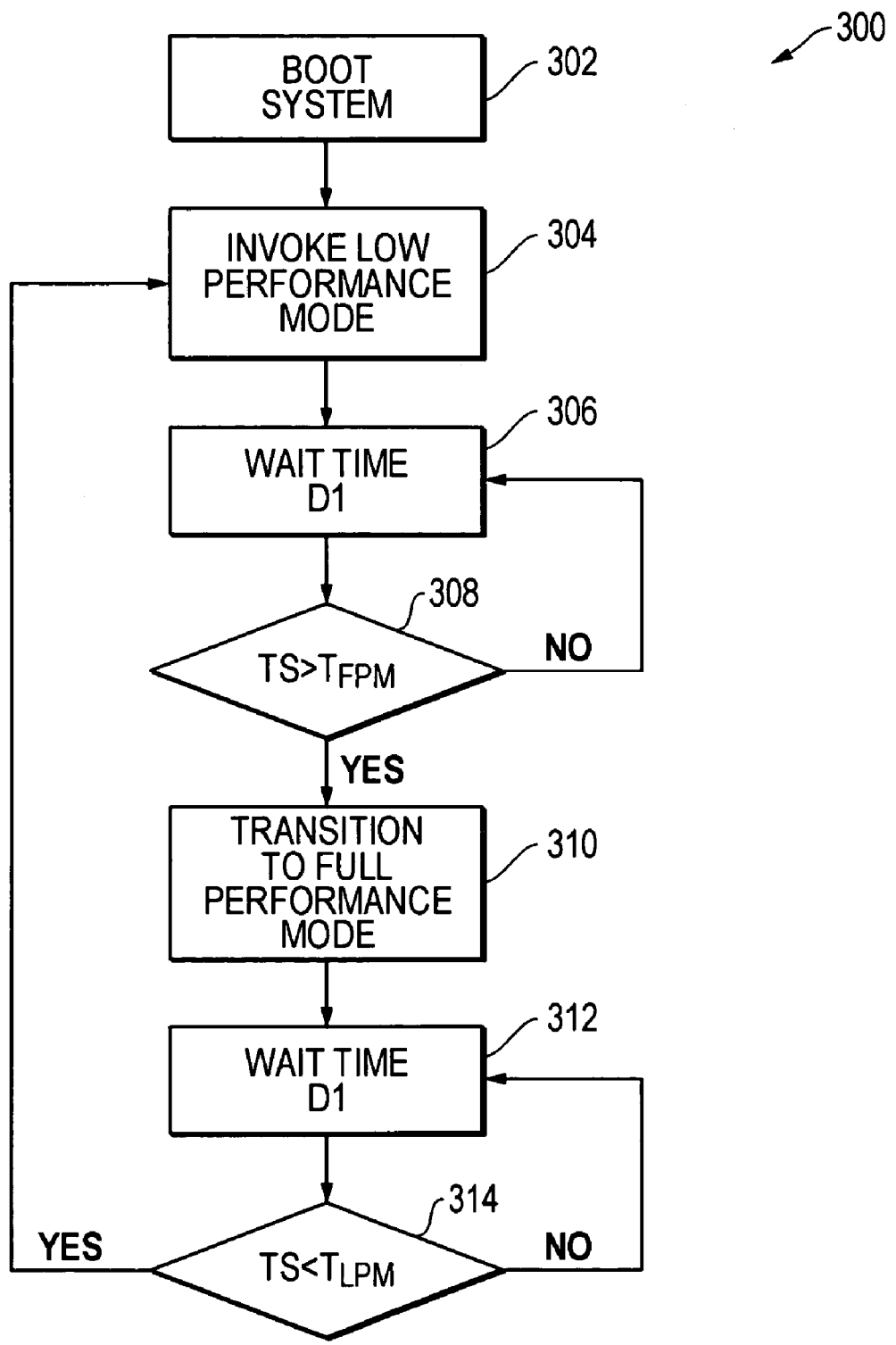
FIG. 3 is a process flow diagram for controlling performance modes for a CPU.

FIG. 3 is a process flow diagram for controlling performance modes for a CPU having a low performance mode (LPM) and a high performance mode (HPM). In embodiment 300 depicted, the first step is to boot the system in block 302 and invoke a low performance mode in block 304. Next, wait time D1 is allowed to pass in block 206. In decision block 308, a temperature TS from a CPU temperature sensor, such as temperature sensor 124, is compared to threshold temperature value representing a full performance mode ($T_{FPM}$). If TS is not greater than $T_{FPM}$, control loops back to block 306. If TS is greater than $T_{FPM}$, then control passes to block 310 where a transition is made to full performance mode. Moving on to block 312, wait time D2 is allowed to pass. In decision block 314, a temperature TS from a CPU temperature sensor, such as temperature sensor 124, is compared to threshold temperature value representing a low performance mode ($T_{LPM}$). If TS is not less than $T_{LPM}$, control loops back to block 312. If TS is less than $T_{LPM}$, then control loops back to block 304 where a transition is made back to low performance mode. It is noted that with respect to the embodiment for CPU 120 in FIG. 2, the BIOS 112 can communicate through signals 128 to directly set the performance mode bit 122B through communications with the temperature protection mode control block 122A. It is noted, however, that different mechanisms could be provided, if desired, for setting the performance mode of a CPU.

In TABLE 1 below, example values for $T_{FPM}$, $T_{LPM}$, D1 and D2 are provided. It is also noted that the first and second temperature thresholds ($T_{FPM}$ and $T_{LPM}$) could be equal, if desired, and the wait times (D1 and D2) could be different, if desired.

TABLE 1

| Example Values for Two Performance Modes | | | |
| --- | --- | --- | --- |
| D1 | D2 | $T_{LPM}$ | $T_{FPM}$ |
| 5 seconds | 5 seconds | 42° C. | 50° C. |

In general terms, therefore, the present invention utilizes the sensed temperature value as an indication of CPU utilization and controls performance modes based upon the sensed temperature values. In the embodiment 300, the system is first booted into low performance mode. When the temperature then rises above the first threshold value ($T_{FPM}$), utilization is deemed to have risen to a level that a higher performance mode is needed. A transition is, therefore, made to full performance mode. If the temperature then falls below a second threshold value ($T_{LPM}$), utilization is deemed to have fallen to a level that a lower performance mode is satisfactory. A transition is, therefore, made to low performance mode. The process then repeats. It is noted that the number of performance mode steps and the number of temperature threshold levels can be selected and configured as desired. Configuring them as different values provides for hystorisis that can allow for more stable operational break points.

Figure 4:
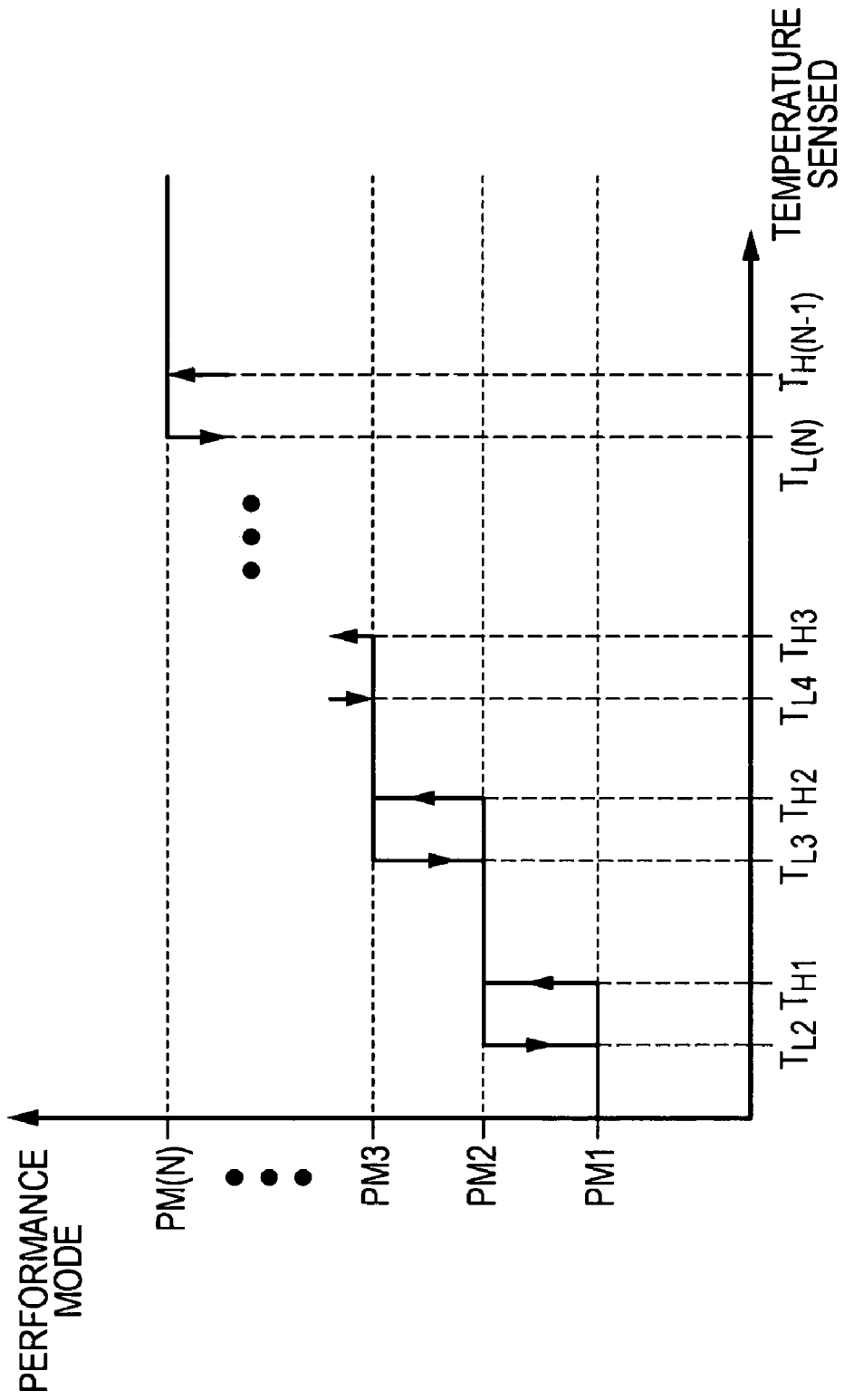
FIG. 4 is a diagram for performance modes versus temperature levels where a CPU has a plurality of different performance mode levels being controlled according to the present invention.

FIG. 4 is a graph showing an embodiment with multiple different performance modes and associated temperature threshold levels. Different performance modes are set forth on the y-axis as PM1, PM2, PM3 . . . PM(N) with PM1 being the lowest performance mode and PM(N) being the highest performance mode. Each performance mode has associated with it a temperature threshold at which a move to the next higher performance mode is initiated and a temperature threshold at which a move to the next lower mode is initiated. For example, PM1 has a high temperature threshold $TH_1$. When a temperature at this level is sensed, a transition to PM2 is made. PM2 has a high temperature threshold $T_{H2}$. When a temperature at this level is sensed, a transition to PM3 is made. PM3 has a high temperature threshold $T_{H3}$. When a temperature at this level is sensed, a transition to PM4 is made. And so on, until PM(N−1) is reached. PM(N−1) has a high temperature threshold $T_{H(N-1)}$. when When a temperature at this level is sensed, a transition to PM(N) is made. In dropping to lower performance levels, when a low temperature $T_{L2}$ is reached when in PM2, a transition to PM1 is made. When a low temperature $T_{L3}$ is reached when in PM3, a transition to PM2 is made. When a low temperature $T_{L4}$ is reached when in PM3, a transition to PM2 is made. And so on, until PM(N) is reached. When a low temperature $T_{L(N)}$ is reached when in PM(N), a transition to PM(N−1) is made. It is noted that more complicated algorithms could be implemented, if desired, for determining which performance mode is utilized as temperature changes.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for controlling microprocessor performance modes, comprising:

providing at least two performance modes for a microprocessor with a first performance mode being higher than a second performance mode;

sensing an edge temperature related to an edge temperature of the microprocessor as an indication of microprocessor utilization;

sensing a core temperature related to a core temperature for the microprocessor as an indication of an over-heating condition;

selecting the first performance mode for the microprocessor if the sensed edge temperature rises above a first threshold level, the first threshold level being a non-danger threshold level;

selecting the second performance mode for the microprocessor if the sensed edge temperature falls below a second threshold level, the second threshold level being a non-danger threshold level; and placing the microprocessor in a low power protection mode if the sensed core temperature rises above a danger threshold level, wherein the danger threshold level is different from the first and second threshold levels.

2. The method of claim 1, wherein the selecting steps are performed by control circuitry outside the microprocessor package.

3. The method of claim 2, wherein the placing step is performed by control circuitry within the microprocessor package.

4. The method of claim 1, further comprising initially setting the microprocessor in the second performance mode, invoking the first performance mode when the sensed edge temperature rises above the first threshold level, and returning to the second performance mode if the sensed edge temperature falls below the second threshold level.

5. The method of claim 1, wherein the first and second threshold levels are the same.

6. The method of claim 1, wherein the first and second threshold levels are different and the first threshold level is higher than the second threshold level.

7. The method of claim 6, wherein the microprocessor has only two performance modes.

8. The method of claim 1, wherein the microprocessor has three or more performance modes.

9. The method of claim 1, wherein the performance modes are controlled by adjusting a clock speed applied to the microprocessor, by adjusting a voltage supply applied to the microprocessor, or by adjusting both.

10. An information handling system having microprocessor performance mode control, comprising:

a microprocessor having at least two performance modes with a first performance mode being higher than a second performance mode;

an edge temperature sensor configured to sense edge temperatures related to the microprocessor as an indication of microprocessor utilization;

a core temperature sensor configured to measure core temperatures related to the microprocessor as an indication of an over-heating condition;

control circuitry coupled to receive a signal from the edge temperature sensor and to control the microprocessor performance mode, the control circuitry being configured to select the first performance mode for the microprocessor if the sensed edge temperature rises above a first threshold level and to select the second performance mode for the microprocessor if the sensed edge temperature falls below a second threshold level, the first and second threshold levels being non-danger threshold levels; and protection control circuitry coupled to receive a signal from the core temperature sensor and to control the microprocessor to enter a low power protection mode if the core temperature exceeds a danger threshold level, wherein the danger threshold level is different from the first and second threshold levels.

11. The information handling system of claim 10, further comprising clock control circuitry coupled to the microprocessor to provide a clock speed input and voltage control circuitry coupled to the microprocessor to provide a voltage supply level input, the clock control circuitry and the voltage control circuitry being configured to receive control input signals from the control circuitry such that performance modes are controlled by adjusting a clock speed applied to the microprocessor, by adjusting a voltage supply applied to the microprocessor, or by adjusting both.

12. The information handling system of claim 10, where the microprocessor comprises performance mode control circuitry configured to set a performance mode based upon a control setting, the control setting being adjustable based upon an external control signal, and wherein the control circuitry is coupled to provide the control signal to the microprocessor.

13. The information handling system of claim 10, wherein the control circuitry is located external to a package for the microprocessor.

14. The information handling system of claim 10, wherein the control circuitry is configured to initially set the microprocessor in the second performance mode, to invoke the first performance mode when the sensed edge temperature rises above the first threshold level, and to return to the second performance mode if the sensed edge temperature falls below the second threshold level.

15. The information handling system of claim 13, wherein the protection control circuitry is located within a package for the microprocessor.

16. The information handling system of claim 15, wherein the control circuitry comprises a storage device configured to store BIOS software.

17. The information handling system of claim 10, wherein the microprocessor has only two performance modes.

18. The information handling system of claim 10, wherein the first and second threshold levels are the same.

19. The information handling system of claim 10, wherein the first and second threshold levels are different and the first threshold level is higher than the second threshold level.

20. The method of claim 10, wherein the microprocessor has three or more performance levels.

* * * * *